United States Patent
Nakajima et al.

(10) Patent No.: US 10,915,837 B2
(45) Date of Patent: Feb. 9, 2021

(54) METHOD, SERVER, COMPUTER-READABLE COMMAND, AND RECORDING MEDIUM FOR PROVIDING RECOMMENDED OPERATION CONDITION FOR PLANT

(71) Applicant: COSMO OIL CO., LTD., Tokyo (JP)

(72) Inventors: Nobumasa Nakajima, Tokyo (JP); Susumu Kikuchi, Tokyo (JP); Kazuo Idei, Saitama (JP)

(73) Assignee: COSMO OIL CO., LTD., Tokyo (JP)

( * ) Notice: Subject to any disclaimer, the term of this patent is extended or adjusted under 35 U.S.C. 154(b) by 0 days.

(21) Appl. No.: 16/615,457

(22) PCT Filed: May 23, 2018

(86) PCT No.: PCT/JP2018/019891
§ 371 (c)(1),
(2) Date: Nov. 21, 2019

(87) PCT Pub. No.: WO2018/216746
PCT Pub. Date: Nov. 29, 2018

(65) Prior Publication Data
US 2020/0175436 A1    Jun. 4, 2020

(30) Foreign Application Priority Data

May 25, 2017 (JP) ................................. 2017-103776

(51) Int. Cl.
| C10G 45/72 | (2006.01) |
| G06Q 50/04 | (2012.01) |
| G06Q 10/04 | (2012.01) |

(52) U.S. Cl.
CPC ............. *G06Q 10/04* (2013.01); *C10G 45/72* (2013.01); *G06Q 50/04* (2013.01)

(58) Field of Classification Search
CPC ................................ C10G 45/72; G06Q 50/04
See application file for complete search history.

(56) References Cited

U.S. PATENT DOCUMENTS

| 5,341,313 A * | 8/1994 | Parrott ................... G06F 30/00 703/6 |
| 5,841,678 A * | 11/1998 | Hasenberg ............. C10G 45/72 703/10 |
| 2019/0322950 A1 | 10/2019 | Nakajima et al. | |

FOREIGN PATENT DOCUMENTS

| JP | 2002-132304 A | 5/2002 |
| JP | 2002-372507 A | 12/2002 |
| JP | 2003-58206 A | 2/2003 |
| JP | 2003-170062 A | 6/2003 |
| JP | 2002329187 A | 11/2015 |
| WO | 00/77127 A1 | 12/2000 |
| WO | 2015019077 A1 | 2/2015 |

OTHER PUBLICATIONS

International Search Report (PCT/ISA/210) dated Aug. 21, 2018 by the International Searching Authority in counterpart International Patent Application No. PCT/JP2018/019891.
Written Opinion (PCT/ISA/237) dated Aug. 21, 2018 by the International Searching Authority in counterpart International Patent Application No. PCT/JP2018/019891.
Communication dated Nov. 18, 2020 issued by the European Patent Office in application No. 18806072.7.
Joly, M., et al., "Refinery production planning and scheduling: the refining core business", Brazilian Journal of Chemical Engineering, vol. 29, No. 2, Jun. 1, 2012, pp. 371-384.
Kadambur, R., et al: "Multilevel production planning in a petrochemical industry using elitist Teaching-Learning-Based-Optimiza", Expert Systems With Applications, Oxford, GB, vol. 42, No. 1, Aug. 20, 2014, pp. 628-641.

* cited by examiner

*Primary Examiner* — Randy Boyer
(74) *Attorney, Agent, or Firm* — Sughrue Mion, PLLC

(57) ABSTRACT

Provided is a method for providing a recommended operating condition with which an oil refinery device can be operated more efficiently. A server 20: acquires past operational data for a device, a scheduled operating condition which is an operation condition for the device scheduled by a user, and plant information including at least a usage expiry time of the device; creates a user-specific catalyst deterioration function from the past operational data; calculates, on the basis of the catalyst deterioration function, the plant information, and the schedule operating condition, a recommended operating condition that achieves a catalyst lifetime which is later than the usage expiry time of the device and is earlier than the catalyst lifetime when the device is operated under a scheduled operating condition calculated on the basis of the scheduled operating condition and the catalyst deterioration function; and transmits the recommended operating condition to a user terminal.

8 Claims, 8 Drawing Sheets

FIG. 3A

| PLEASE INPUT "PLANT INFORMATION" | | |
|---|---|---|
| STATUTORY FINAL OPERATION DATE (YEAR/MONTH/DAY) | | 2018/2/6 |
| NUMBER OF REMAINING DAYS (DAYS) | | 300 |
| UPPER LIMIT TEMPERATURE (°C) | | 380 |
| UPPER LIMIT THROUGHPUT (BPSD) | | 36000 |
| DESIGNED EXTRACTION QUANTITIES OF RESPECTIVE DISTILLATES (kl/h) | DRY GAS | 5 |
| | C3-C4 | 5 |
| | NAPH | 10 |
| | UFT-LGO | 160 |
| CATALYST CHARGE QUANTITY ($m^3$) | | 195 |

FIG. 3B

PLEASE INPUT "PAST OPERATION DATA"

| SECTION | DATE | NUMBER OF CUMULATIVE DAYS | OPERATION CONDITIONS ||||||| PROPERTIES OF STOCK OIL ||||| PROPERTY OF PRODUCED OIL |
|---|---|---|---|---|---|---|---|---|---|---|---|---|---|---|
| | | | THROUGHPUT | LIQUID SPACE VELOCITY | PARTIAL PRESSURE OF HYDROGEN | RATIO OF HYDROGEN TO OIL | WABT | SULFUR CONCENTRATION | DENSITY (15°C) | NITROGEN CONCENTRATION | AROMA CONCENTRATION | T50 | T90 | SULFUR CONTENT |
| | | | BPSD | /hr | MPa | NM3/KL | °C | mass% | g/mL | mass% | vol% | °C | °C | wtppm |
| 1 | 2015/7/1 | 35 | 22981 | 0.89 | 4.6 | 279 | 336.2 | 0.73 | 0.8447 | 0.0072 | 25.7 | 299 | 345.5 | 3 |
| 2 | 2016/8/1 | 185 | 35217 | 1.05 | 5 | 328 | 331.7 | 0.84 | 0.8474 | 0.0091 | 26.1 | 299.5 | 343 | 7 |
| 3 | 2017/2/1 | 340 | 35293 | 1.05 | 4.8 | 249 | 336.1 | 0.95 | 0.8494 | 0.0090 | 26.8 | 299.5 | 345 | 8 |

FIG. 3C

PLEASE INPUT "SCHEDULED OPERATION CONDITION"

| SECTION | NUMBER OF OPERATING DAYS | NUMBER OF CUMULATIVE DAYS | OPERATION CONDITIONS ||||| PROPERTIES OF STOCK OIL ||||| PROPERTY OF PRODUCED OIL |
|---|---|---|---|---|---|---|---|---|---|---|---|---|---|---|
| | | | THROUGHPUT | LIQUID SPACE VELOCITY | PARTIAL PRESSURE OF HYDROGEN | RATIO OF HYDROGEN TO OIL | WABT | SULFUR CONCENTRATION | DENSITY (15°C) | NITROGEN CONCENTRATION | AROMA CONCENTRATION | T50 | T90 | SULFUR CONTENT |
| | | | BPSD | /hr | MPa | NM3/KL | °C | mass% | g/mL | mass% | vol% | °C | °C | wtppm |
| 1 | 35 | 35 | 22981 | 0.89 | 4.6 | 279 | 336.2 | 0.73 | 0.8447 | 0.0072 | 25.7 | 299 | 345.5 | 3 |
| 2 | 150 | 150 | 35217 | 1.05 | 5 | 328 | 331.7 | 0.84 | 0.8474 | 0.0091 | 26.1 | 299.5 | 343 | 7 |
| 3 | 155 | 340 | 35293 | 1.05 | 4.8 | 229 | 336.1 | 0.95 | 0.8494 | 0.0090 | 26.5 | 299.5 | 345 | 8 |
| 4 | 150 | 490 | 19800 | 0.66 | 5 | 260 | 355 | 0.93 | 0.8452 | 0.0090 | 26 | 298.2 | 344 | 8 |
| 5 | 150 | 640 | 32500 | 0.7 | 5 | 260 | 375 | 1.2 | 0.8501 | 0.0075 | 25.1 | 297.7 | 345 | 5 |

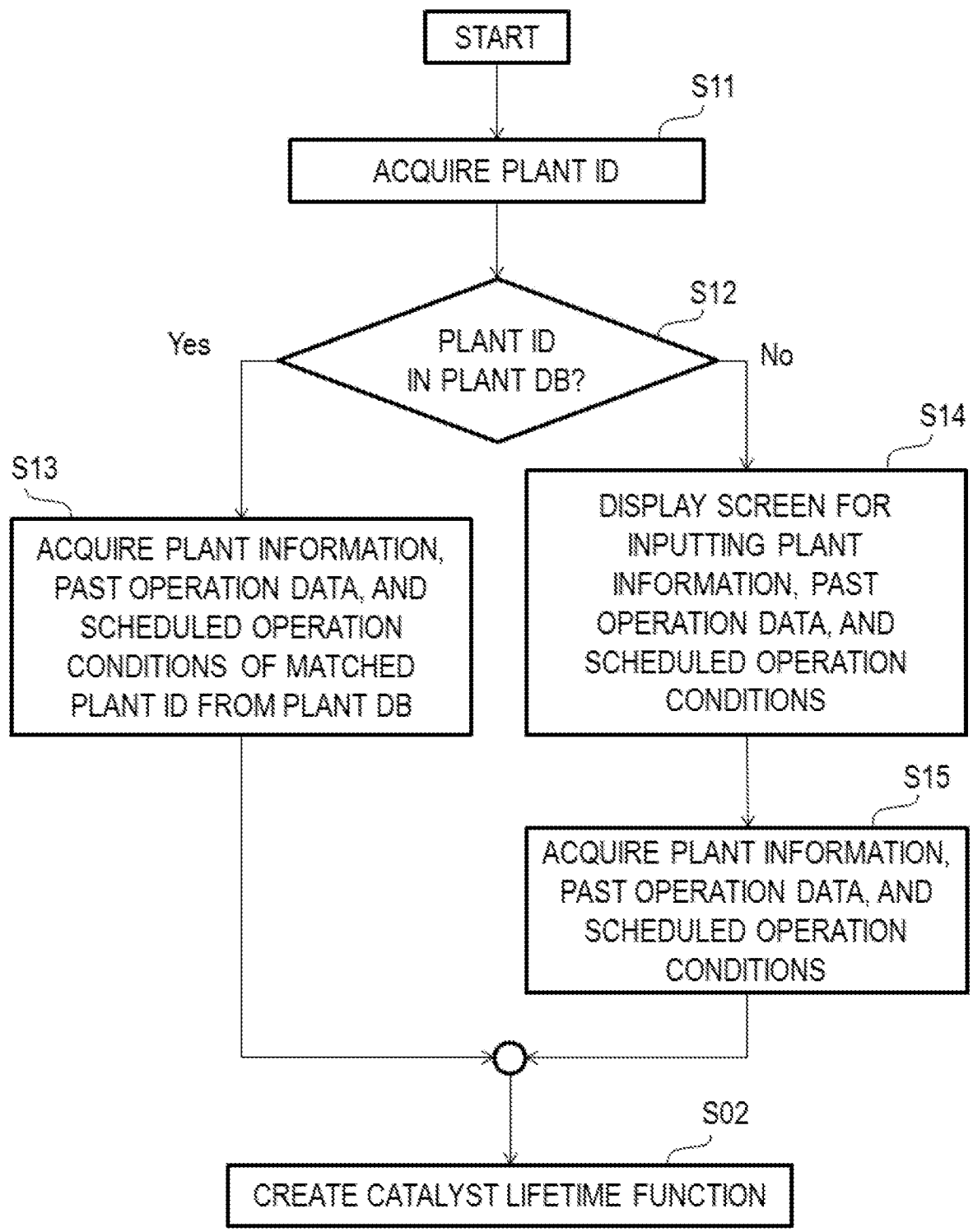

FIG. 5A

WHEN OPERATED UNDER "SCHEDULED OPERATION CONDITIONS", OPERATING TEMPERATURE AND ESTIMATED PRODUCED OILS, OPERATING COST, AND LIFETIME MARGIN ARE AS FOLLOWS

| SECTION | NUMBER OF OPERATING DAYS | NUMBER OF CUMULATIVE DAYS | OPERATING TEMPERATURE | OPERATION CONDITIONS | | | | |
|---|---|---|---|---|---|---|---|---|
| | | | | THROUGHPUT | LIQUID SPACE VELOCITY | PARTIAL PRESSURE OF HYDROGEN | RATIO OF HYDROGEN TO OIL | SULFUR CONTENT IN STOCK OIL |
| | | | °C | BPSD | /hr | Mpa | Nm3/kl | mass% |
| 1 | 35 | 35 | 320 | 22981 | 2.59 | 4.6 | 279 | 0.73 |
| 2 | 150 | 185 | 332 | 35217 | 1.55 | 5.0 | 328 | 0.94 |
| 3 | 155 | 340 | 340 | 35203 | 1.55 | 4.8 | 249 | 0.95 |
| 4 | 150 | 490 | 355 | 19520 | 2.68 | 5.0 | 250 | 0.93 |
| 5 | 150 | 640 | 375 | 20520 | 2.70 | 5.0 | 250 | 1.20 |

PROPERTIES OF PRODUCED OILS

| PERCENT YIELD | | vol% |
|---|---|---|
| | DRY GAS | 0.3 |
| | C3-C4 | 0.4 |
| | NAPH | 3.5 |
| | LFT-LGO | 97.6 |
| YIELD AMOUNT | DRY GAS | 7,855 |
| | C3-C4 | 10,432 |
| | NAPH | 104,321 |
| | LFT-LGO | 2,886,310 |
| SULFUR CONCENTRATION (LFT-LGO) | | <ppm> 8 |

SCHEDULED OPERATING COST

| HYDROGEN | Nm3 | 155,720 |
| | Nm3/M | 58 |
| FUEL | FOE-kl | 18,642 |
| | FOE-L/M | 4 |

| LIFETIME MARGIN | |
|---|---|
| LIFETIME MARGIN [DAYS] WITH RESPECT TO EXPIRATION DATE | 40 |

FIG. 5B

WITH FOLLOWING "RECOMMENDED OPERATION CONDITIONS", ESTIMATED PRODUCED OILS, OPERATING COST, AND LIFETIME MARGIN ARE AS FOLLOWS (THROUGHPUT PRIORITY MODE)

| SECTION | NUMBER OF OPERATING DAYS | NUMBER OF CUMULATIVE DAYS | OPERATING TEMPERATURE | OPERATION CONDITIONS | | | | |
|---|---|---|---|---|---|---|---|---|
| | | | | THROUGHPUT | LIQUID SPACE VELOCITY | PARTIAL PRESSURE OF HYDROGEN | RATIO OF HYDROGEN TO OIL | SULFUR CONTENT IN STOCK OIL |
| | | | °C | BPSD | /hr | Mpa | Nm3/kl | mass% |
| 1 | 35 | 35 | 320 | 22981 | 2.59 | 4.6 | 279 | 0.73 |
| 2 | 150 | 185 | 332 | 35217 | 1.55 | 5 | 328 | 0.94 |
| 3 | 155 | 340 | 340 | 35203 | 1.55 | 4.8 | 249 | 0.95 |
| 4 | 150 | 490 | 370 | 35286 | 1.55 | 4.8 | 295 | 0.93 |
| 5 | 150 | 640 | 375 | 32520 | 0.95 | 5.1 | 328 | 1.20 |

PROPERTIES OF PRODUCED OILS

| PERCENT YIELD | | vol% |
|---|---|---|
| | DRY GAS | 0.3 |
| | C3-C4 | 0.4 |
| | NAPH | 3.7 |
| | LFT-LGO | 98.2 |
| YIELD AMOUNT | DRY GAS | 8,233 |
| | C3-C4 | 11,881 |
| | NAPH | 115,367 |
| | LFT-LGO | 3,351,499 |
| SULFUR CONCENTRATION (LFT-LGO) | | <ppm> 7 |

RECOMMENDED OPERATING COST

| HYDROGEN | Nm3 | 165,562 |
| | Nm3/M | 63 |
| FUEL | FOE-kl | 19,352 |
| | FOE-L/M | 6 |

| LIFETIME MARGIN | |
|---|---|
| LIFETIME MARGIN [DAYS] WITH RESPECT TO EXPIRATION DATE | 0 |

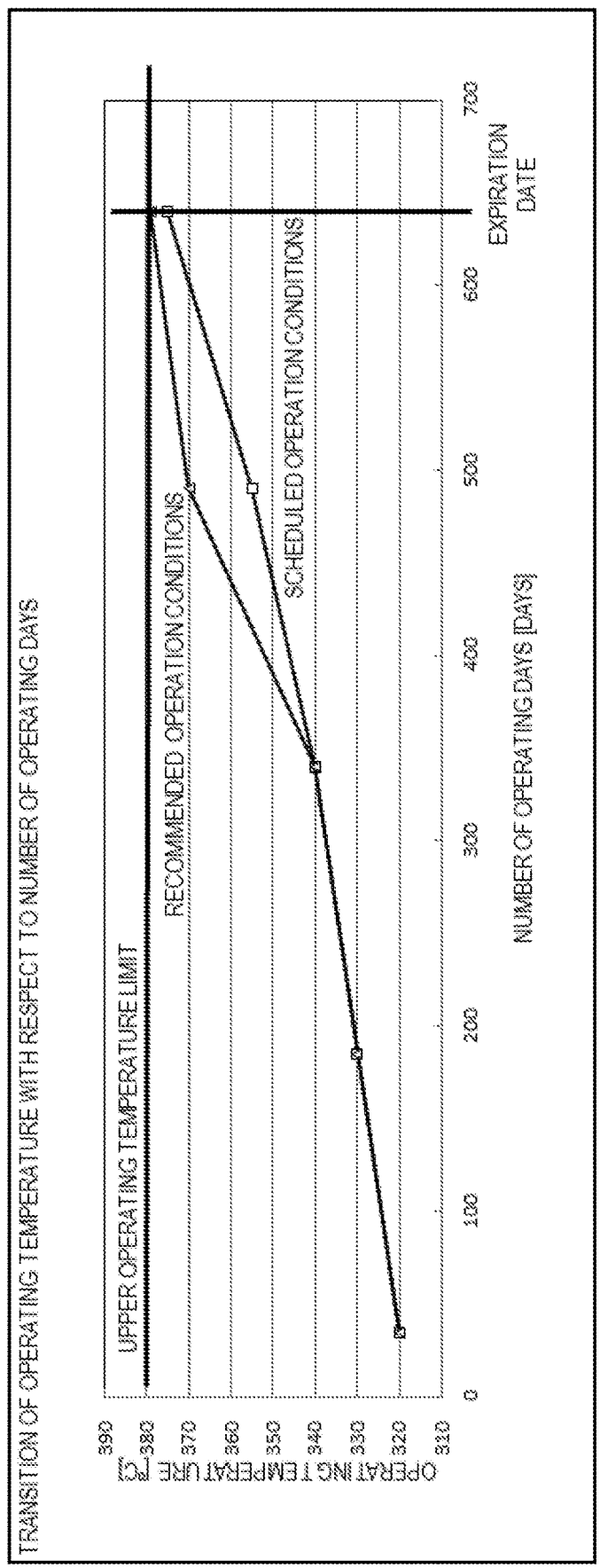

FIG. 6

THERE ARE FOLLOWING ADVANTAGES WHEN OPERATED UNDER "RECOMMENDED OPERATION CONDITIONS"
NUMBER OF CUMULATIVE DAYS: 640 DAYS

| | | | | THROUGHPUT PRIORITY | QUALITY PRIORITY | PERCENT YIELD PRIORITY | ENERGY SAVING PRIORITY |
|---|---|---|---|---|---|---|---|
| PRODUCTS | PERCENT YIELD | DRY GAS | wt% | 0.3 | 0.2 | 0.4 | 0.3 |
| | | C3-C4 | | 0.4 | 0.5 | 0.6 | 0.5 |
| | | NAPH | | 3.7 | 4 | 5 | 4 |
| | | UFT-LGO | | 98.9 | 97 | 99 | 99 |
| | YIELD AMOUNT | DRY GAS | t | 8,203 | 9,170 | 8,278 | 8,201 |
| | | C3-C4 | | 11,881 | 12,001 | 12,003 | 12,003 |
| | | NAPH | | 115,387 | 124,431 | 135,460 | 123,410 |
| | | UFT-LGO | | 3,051,469 | 2,991,543 | 3,254,324 | 3,032,133 |
| | ASSESSED VALUE | DRY GAS | MILLION JPY | 210 | 208 | 221 | 213 |
| | | C3-C4 | | 525 | 540 | 652 | 553 |
| | | NAPH | | 7,498 | 7,230 | 7,679 | 7,213 |
| | | UFT-LGO | | 219,706 | 212,310 | 243,129 | 214,320 |
| | QUALITY (SULFUR CONTENT) | UFT-LGO | wppm | 7 | 10 | 8 | 8 |
| | SUBTOTAL (1) | | MILLION JPY | 227,940 | 226,341 | 232,154 | 212,154 |
| UTILITIES | CONSUMPTION | HYDROGEN | kNm3 | 195,668 | 221,423 | 196,821 | 184,313 |
| | | | Nm3/kl | 63 | 76 | 64 | 61 |
| | | FUEL | FOE-kl | 18,358 | 19,452 | 18,542 | 18,091 |
| | | | FOE-L/kl | 6 | 6 | 7 | 5 |
| | COST | HYDROGEN | MILLION JPY | 3,575 | 3,123 | 3,421 | 3,212 |
| | | FUEL | | 1,156 | 1,023 | 1,198 | 1,078 |
| | SUBTOTAL (2) | | MILLION JPY | 4,731 | 4,146 | 4,619 | 4,290 |
| SUBTOTAL (3)=(1)-(2) | | | MILLION JPY | 223,208 | 222,195 | 227,535 | 207,864 |
| COST ADVANTAGE | | | MILLION JPY/YEAR | 89,332 | 88,927 | 91,884 | 83,191 |
| TEMPERATURE BEFORE SUSPENSION OF PLANT | | | °C | 382 | 377 | 379 | 379 |
| DIFFERENCE FROM UPPER LIMIT TEMPERATURE | | | °C | 0 | 3 | 1 | 1 |
| PROCESSING ADVANTAGE | | | | 2 | 3 | 1 | 4 |

METHOD, SERVER, COMPUTER-READABLE COMMAND, AND RECORDING MEDIUM FOR PROVIDING RECOMMENDED OPERATION CONDITION FOR PLANT

TECHNICAL FIELD

The present invention relates to a method, a server, a computer-readable command, and a recording medium for providing a recommended operation condition for a plant.

BACKGROUND ART

A period between operation start and operation suspension of a petroleum refinery of a petroleum refining plant is prescribed by laws and regulations. During the suspension of the petroleum refinery, a maintenance of devices, an exchange of a catalyst, etc. are performed.

PRIOR ART DOCUMENT

Patent Document

Patent Document 1: JP2003-58206A

SUMMARY OF INVENTION

Problem to be Solved by Invention

Catalyst has a lifetime. The lifetime varies depending on properties of stock oil and operation conditions. In each petroleum refinery, examination is made to set an operation condition under which the lifetime of the catalyst ends on the operation suspension date prescribed by the laws and regulations. However, as the current situation, it is difficult to practically estimate the lifetime of the catalyst so accurately, and the operation condition is therefore set with a margin large enough to prevent the lifetime of the catalyst from ending by the operation suspension date. Simulation inside the plant using a dynamic model has been known as in Patent Document 1. However, it is difficult to immediately obtain a recommended operation condition even by the simulation.

Therefore, the present invention is to provide a method, a server, a computer-readable command, and a recording medium for providing a recommended operation condition for operating a petroleum refining plant more efficiently.

Means for Solving the Problem

To achieve the aforementioned object, the following is provided according to the present invention. A method for providing a recommended operation condition for a plant that produces oils by passing stock oil through a catalyst, the recommended operation condition being provided by use of a server connected to a user terminal through a network. The server includes a processor and a non-transitory computer-readable command recording medium storing a computer-readable command. The method causes the server to acquire, from the user terminal, past operation data of the plant, a scheduled operation condition, the scheduled operation condition being an operation condition of the plant scheduled by a user, and plant information including at least an expiration date for use of the plant, create a catalyst degradation function specific to the user from the past operation data, and calculate, based on the catalyst degradation function, the plant information, and the scheduled operation condition, a recommended operation condition with which a catalyst lifetime ends earlier than a catalyst lifetime calculated based on the scheduled operation condition and the catalyst degradation function on a premise that the plant is operated under the scheduled operation condition and later than the expiration date for use of the plant, and transmit the recommended operation condition to the user terminal. Also provided are the server executing the method described above, a computer-readable command that causes the server to execute the method described above, and a recording medium storing the computer-readable command.

Effect of Invention

According to the present invention, it is possible to obtain a recommended operation condition with which a catalyst lifetime ends earlier than a catalyst lifetime when a plant is operated under a scheduled operation condition and later than an expiration date for use of the plant. Accordingly, it is possible to operate the plant more efficiently.

BRIEF DESCRIPTION OF THE DRAWINGS

FIGS. 3A to 3C illustrate input screens displayed on a user terminal.

FIG. 4 is a flow chart for acquiring plant information, past operation data and a scheduled operation condition.

FIGS. 5A to 5C illustrate output screens displayed on the user terminal.

FIG. 6 illustrates an output screen displayed on the user terminal.

EMBODIMENTS OF INVENTION

Figure 1:
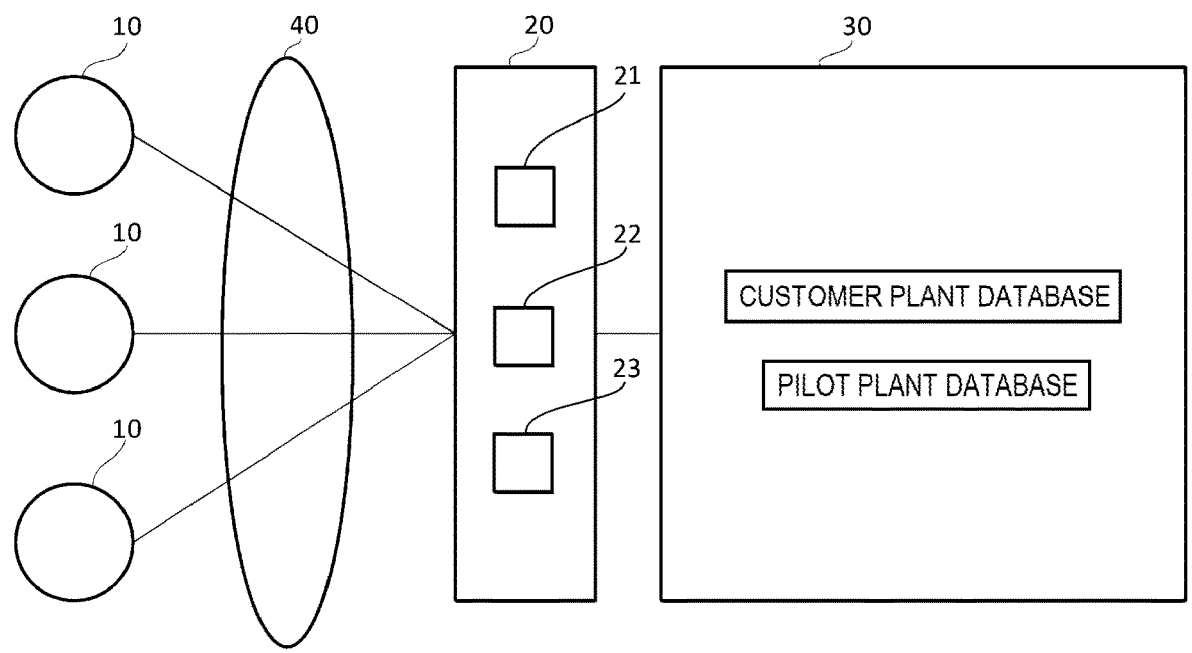
FIG. 1 is a configuration diagram of a system for implementing a method according to an embodiment of the present invention.

An embodiment of the present invention will be described below in more detail with reference to the drawings. FIG. 1 is a view of the configuration of a system implementing a method for providing a recommended operation condition according to the present embodiment. The method according to the present embodiment includes acquiring, from a user, information about a petroleum refining plant and a scheduled operation condition of the plant scheduled by the user, calculate a recommended operation condition excellent in economic index etc. from the acquired information and condition and a catalyst lifetime derived from a pilot plant database, and provide the calculated recommended operation condition to the user.

As shown in FIG. 1, the system 1 has user terminals 10, a network 40, a main server 20, and a data server 30. The user terminals 10 and the main server 20 are connected through the network 40. The main server 20 and the data server 30 are communicably connected. The main server 20 may be a single server or may be constituted by a plurality of servers. The user terminals 10 and the main server 20 may be connected by a dedicated line or may be connected by an internet connection. The main server 20 and the data server 30 may be configured integrally or may be configured separately. Each of the user terminals 10 has a display device provided integrally with the user terminal 10 or separately from the user terminal 10. The main server 20 includes a processor 21 such as a CPU (Central Processing Unit), an ROM 22 (Read Only Memory) (an example of a non-transitory computer-readable command recording medium) storing various programs (computer-readable commands), and an RAM 23 (Random Access Memory) temporarily storing various data. The processor 21 is configured to expand a program designated from the various programs stored in the ROM 22 onto the RAM 23, and to execute processing in cooperation with the RAM 23. The processing will be described as follows in detail.

Figure 2:
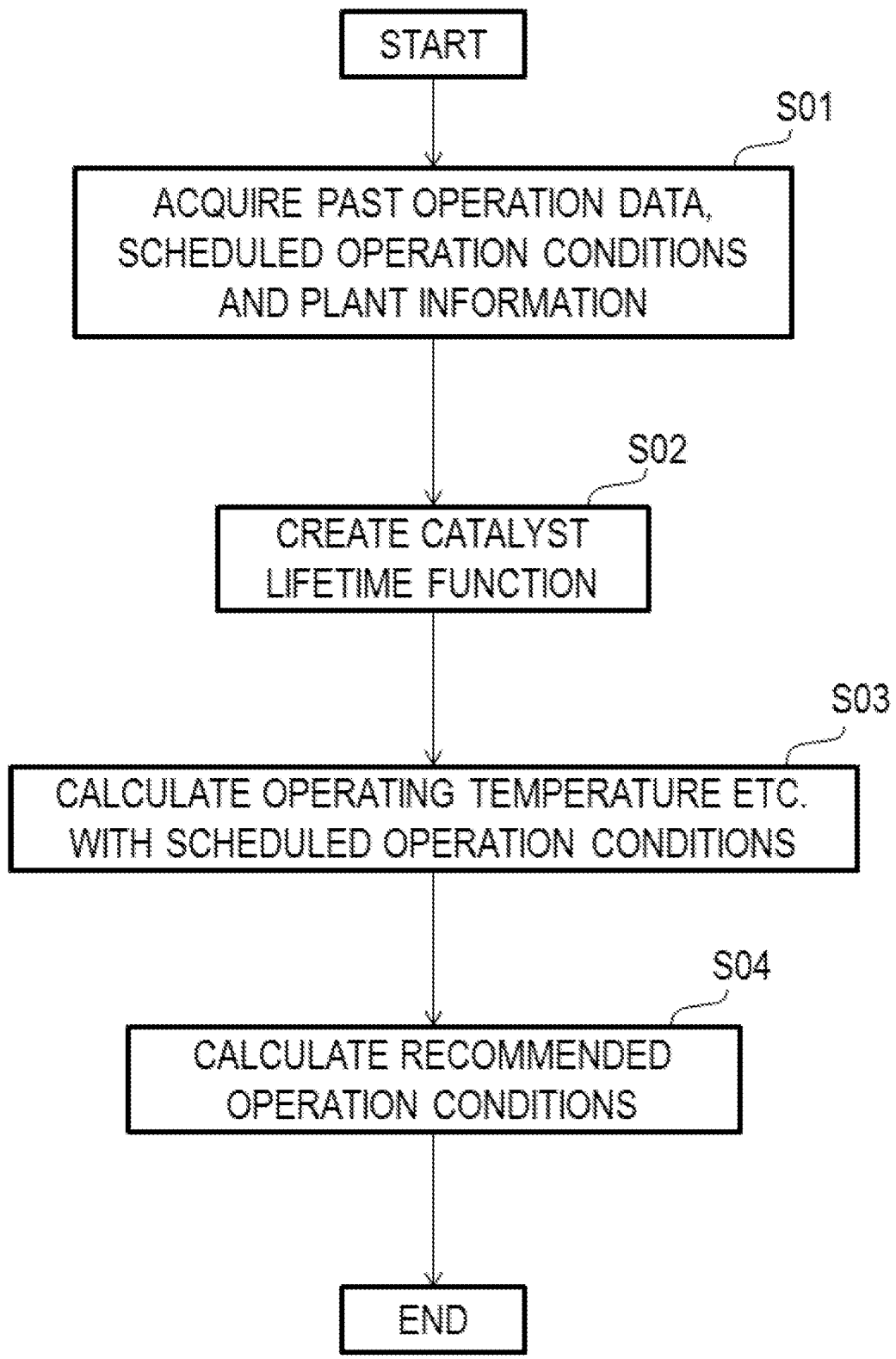
FIG. 2 is a flow chart of the method according to the embodiment.

FIG. 2 is a flow chart of the method according to the present embodiment. The following description will be made for a case where the user's plant is a light gas oil desulfurization plant which applies desulfurization treatment to stock oil to obtain light gas oil. The present invention is applicable to any of a direct desulfurization plant, an indirect desulfurization plant, a kerosene desulfurization plant, a naphtha desulfurization plant and a gasoline desulfurization plant.

As shown in FIG. 2, first, the main server 20 acquires plant information, past operation data, and a scheduled operation condition from one of the user terminals 10. FIG. 3 is an example of input screens displayed on the user terminal 10. FIG. 3A shows the input screen of the plant information. FIG. 3B shows the input screen of the past operation data. FIG. 3C shows the input screen of the scheduled operation condition.

As shown in FIG. 3A, the main server 20 instructs the user to input the plant information. Examples of the plant information include a statutory final operation date (hereinafter referred to as expiration date), an upper temperature limit [° C.] of the plant, an upper throughput limit [BPSD] of the plant, designed upper limit extraction quantities of distillates (a designed upper limit extraction quantity of DRY GAS including methane, ethane, etc. as main components, a designed upper limit extraction quantity of C3-C4 gas such as propane, butane, etc., a designed upper limit extraction quantity of NAPH (naphtha), and a designed upper limit extraction quantity of UFT-LGO serving as light gas oil) [kl/h], a catalyst charge quantity [m$^3$], etc.

The number of operating days of the petroleum refining plant is prescribed by laws and regulations in which safety etc. is taken into consideration, and the plant is required to be suspended periodically for maintenance etc. During the suspension of the petroleum refining plant, the catalyst inside the plant is exchanged. The main server 20 displays, on the user terminal 10, a screen allowing the user to input an expiration date prescribed by the laws and regulations etc. The plant has an upper limit of an operating temperature, an upper throughput limit of the stock oil, and a charging quantity of the catalyst that are predetermined. The main server 20 displays, on the user terminal 10, a screen allowing the user to input the upper temperature limit, the upper throughput limit and the charging quantity of the catalyst.

As shown in FIG. 3B, the main server 20 acquires information on operation conditions, properties of the stock oil supplied to the plant, and a property of obtained produced oil, as the past operation data. As the operation conditions, the main server 20 acquires a throughput, a liquid space velocity, partial pressure of hydrogen, a ratio of hydrogen to oil, and WABT (an average temperature of a catalyst layer) for every number of cumulative operating days. As the properties of the stock oil, the main server 20 acquires a density of the stock oil at 15° C., a sulfur concentration, a nitrogen concentration, an aroma concentration, T50 temperature, and T90 temperature. As the property of the produced oil, the main server 20 acquires a sulfur concentration of the obtained produced oil.

During operation of the plant, various conditions are changed depending on degradation of the catalyst. In the example shown in FIG. 3B, the operation conditions are changed twice by the time the plant has been operated for 340 days. The main server 20 acquires all change histories of the operation conditions.

As the scheduled operation conditions, the main server 20 acquires information including similar elements to or the same elements as those of the past operation data except the operating temperature, as shown in FIG. 3C. The operating temperature is essential information in operating the plant. When actually operating a commercial plant, a temporary temperature is first set to operate the plant, and the temperature is then finely adjusted by a feeling of a skilled person. For this reason, it is difficult for the user to set the operating temperature as a scheduled operation condition. Therefore, the user is not requested to set the operating temperature as a scheduled operation condition but from the input scheduled operation condition, an optimal operating temperature achieving the scheduled operation condition is provided to the user, as will be described later.

In a case where the user uses the system 1 periodically, it takes labor and time to input the aforementioned information each time. Therefore, processing shown in FIG. 4 may be executed. FIG. 4 is a flow chart for acquiring the plant information, the past operation data and the scheduled operation condition. In the flow chart of FIG. 4, it is assumed that a plant ID and the past operation data, the plant information, and the scheduled operation condition associated with the plant ID are already stored in the data server 30.

As shown in FIG. 4, first, the main server 20 acquires a plant ID from the user terminal 10 (step S11). Next, the main server 20 determines whether a plant ID that matches the acquired plant ID is in the data server 30 or not (step S12). When the plant ID that matches the acquired plant ID is found (step 12: Yes), the main server 20 acquires past operation data, plant information, and a scheduled operation condition associated with the matched plant ID from the data server 30 (step S13).

When the plant ID that matches the acquired plant ID is not found (step S12: No), the main server 20 displays a screen to facilitate an input of past operation data, plant information and a scheduled operation condition on the user terminal 10 (step S14), to acquire the past operation data, the plant information, and the scheduled operation condition from the user terminal 10 (step S15).

Even when the plant ID that matches the acquired plant ID is found in the data server 30 (step S12: Yes), one or more of the past operation data, the plant information, and the scheduled operation condition may not be stored yet. In this case, the main server 20 may display, on the user terminal 10, the screen for prompting the user to input the unrecorded information.

Returning to FIG. 2, once the main server 20 acquires the past operation data, the scheduled operation condition, and the plant information (step S01), the main server 20 creates a catalyst degradation function based on the acquired data, condition and information, and pilot plant data registered on the data server 30 (step S02). The catalyst degradation function is a function expressing a degradation degree of the catalyst. The catalyst lifetime can be calculated based on the catalyst degradation function. The catalyst degradation function expresses the degradation degree of the desulfurization catalyst as a function of the number of oil permeation days t. The degradation degree $\Phi$ of the desulfurization catalyst is defined as a ratio of a reaction rate constant Kt on a t-th oil permeation day to a reaction rate constant K0 on a 0-th oil permeation day. That is, the degradation degree can be expressed as $\Phi=Kt/K0$. As to the catalyst degradation function, see Japanese Patent Application No. 2016-247762 previously filed by the applicant.

The catalyst degradation function is a function which is empirically derived from a property of produced oil or the degradation degree of the catalyst in each of various operation conditions obtained through long years' use of a commercial plant, or enormous information (information recorded in the pilot plant data) about the various operation conditions, the property of the produced oil, and the degradation degree of the catalyst obtained by use of a full-scale test plant (pilot plant).

When the catalyst degradation function is not corrected by specifications of the plant, properties of stock oil, the property of the produced oil to be obtained, etc., it is difficult to use the catalyst degradation function to accurately express the degradation degree of the catalyst. Therefore, in the present embodiment, the main server 20 suitably revises the catalyst degradation function based on the acquired plant information and the acquired past operation data, and creates a user-specific catalyst degradation function adapted to the plant of the user.

As soon as the user-specific catalyst degradation function is created, the main server 20 calculates an operating temperature etc. in the scheduled operation condition (step S03). The main server 20 transmits the calculated operating temperature in the scheduled operation condition, the property of the produced oil, operating cost, and a lifetime margin to the user terminal 10. FIG. 5A shows an example of an output screen displayed on the user terminal 10.

The main server 20 can calculate information about the operating temperature for operating the plant under the scheduled operation conditions, the property of the obtained produced oil, etc. from the obtained user-specific catalyst degradation function and the scheduled operation condition. This is because the temperature (operating temperature) of the catalyst can be obtained when the degradation degree of the catalyst is obtained and a catalyst reaction rate at which the catalyst at that point of time should be made to function is determined. In addition, the property of the produced oil obtained from catalyst reaction can be obtained when the operating temperature is determined.

When the catalyst reaction rate is determined, a hydrogen consumption is determined. Fuel required for operating the plant at the operating temperature is also determined. Therefore, the main server 20 also calculates the hydrogen consumption and a fuel consumption of the plant. Further, the main server 20 can estimate the lifetime of the catalyst when the operating temperature for the catalyst having a known lifetime is determined. The date when the lifetime of the catalyst ends means a date on which the operating temperature for the catalyst exceeds an upper temperature limit of the plant. It is necessary to operate the plant at higher temperature as the catalyst is degraded. This is because the catalyst cannot be used in the plant when the operating temperature exceeds the upper temperature limit of the plant. The main server 20 calculates a lifetime margin by subtracting a difference between the date when the lifetime of the catalyst ends and the expiration date of the plant.

In the scheduled operation conditions shown in FIG. 5A, the lifetime margin is 40 days, and the catalyst cannot be completely used effectively up to the expiration date of the plant. Thus, returning to FIG. 2, the main server 20 calculates a recommended operation condition (step S04). Based on the catalyst degradation function, the plant information, and the scheduled operation condition, the main server 20 calculates the recommended operation condition with which the lifetime of the catalyst ends earlier than a catalyst lifetime when the plant is operated under the scheduled operation condition and later than the expiration date.

The fact that the lifetime margin is 40 days means that there is a margin that the catalyst can maintain its lifetime up to the expiration date even when, for example, the throughput of the stock oil is increased, the sulfur concentration of the produced oil to be obtained is further decreased, a percent yield of a light distillate (light gas oil, kerosene, gasoline) high in value is increased, or the hydrogen consumption or the fuel consumption is reduced. Therefore, the main server 20 calculates the recommended operation conditions under which the catalyst can be used further effectively up to the expiration date.

For example, when the throughput of the stock oil is to be increased, the operating temperature has to be increased in order to increase the reaction rate of the catalyst. Accordingly, the degradation of the catalyst accelerates. Alternatively, when the sulfur concentration of the produced oil is to be decreased, the operating temperature has to be increased in order to increase the reaction rate of the catalyst. Accordingly, the degradation of the catalyst accelerates. In addition, the operating temperature has to be increased in order to increase the percent yield of the light distillate high in value. Accordingly, the degradation of the catalyst accelerates. Alternatively, when the hydrogen consumption or the fuel consumption is to be reduced, the degradation of the catalyst accelerates. The main server 20 uses one of the methods to calculate the recommended operation conditions under which the catalyst can be used more efficiently for the user.

In the present embodiment, the main server 20 first calculates the recommended operation conditions with which the stock oil can be processed as much as possible (throughput priority mode). Since the same values as those of the past operation data are output in sections 1 to 3, respective numerical values in and after a section 4 are values calculated as the recommended operation conditions.

The main server 20 suggests that the throughput in each of the sections 4 and 5 is higher than a corresponding throughput in the scheduled operation conditions. The main server 20 also suggests that a value as the operating temperature is higher than a corresponding value in the scheduled operation conditions with the increase of the throughput. Thus, degradation of the catalyst when the plant is operated under the recommended operation conditions is faster than degradation of the catalyst when the plant is operated under the scheduled operation conditions. When the aforementioned catalyst degradation function is used, it is possible to estimate the lifetime of the catalyst accurately in a comparatively short time. The lifetime margin of the catalyst with respect to the statutory expiration date of the plant is 0 day so that the catalyst can be used to the full up to the statutory expiration date of the plant. The main server 20 can suggest the recommended operation conditions with high economic rationality.

As the recommended operation conditions, the main server 20 calculates the operating temperature, a liquid space velocity, partial pressure of hydrogen, and a ratio of hydrogen to oil in addition to the throughput, and transmits the calculated values to the user terminal 10. The user terminal 10 displays the values as the recommended operation conditions, as shown in FIG. 5B.

When the aforementioned catalyst degradation function is used, properties of produced oils to be obtained or operating cost such as a hydrogen consumption or a fuel consumption can be accurately calculated in a comparatively short time. Therefore, the main server 20 calculates percent yields and yield amounts of DRY GAS, C3-C4, NAPH, and UFT-LGO as the properties of the produced oils to be obtained, and transmits the calculated percent yields and the calculated yield amounts to the user terminal 10. The user terminal 10 displays the percent yields and the yield amounts. Further, the main server 20 calculates a sulfur concentration contained in the UFT-LGO serving as gasoline, and transmits the calculated sulfur concentration to the user terminal 10. The user terminal 10 displays the sulfur concentration.

The main server 20 may be configured to transmit, to the user terminal 10, a graph showing transition of the operating temperature with respect to the number of operating days shown in FIG. 5C, and instruct the user terminal 10 to display the graph. In FIG. 5C, the abscissa designates the number of the operating days, and the ordinate designates the operating temperature. The degradation of the catalyst accelerates as the operating days lapse. Accordingly, the operating temperature increases. When the operating temperature reaches an upper temperature limit of the plant, the plant cannot be operated. Accordingly, the catalyst lifetime is determined by the upper temperature limit of the plant. By the display of the graph shown in FIG. 5C, the user can also accurately grasp a difference between a lifetime margin when the plant is operated under the scheduled operation condition and a lifetime margin when the plant is operated under the recommended operation condition.

The main server 20 may be configured to instruct the user terminal 10 to display a screen of FIG. 6. In the aforementioned description, the main server 20 calculates the recommended operation conditions to increase the throughput in order to effectively use the lifetime of the catalyst. In addition to the method of increasing the throughput in order to effectively use the lifetime of the catalyst, there are other methods such as adjusting the sulfur concentration of the UFT-LGO to an allowable concentration (quality priority mode), increasing the percent yield of the UFT-LGO as much as possible (percent yield priority mode), and making the hydrogen consumption as low as possible (energy saving priority mode).

The main server 20 thus calculates the recommended operation conditions for each of the throughput priority mode, the quality priority mode, the percent yield priority mode, and the energy saving priority mode, and calculates percent yields and yield amounts of DRY GAS, C3-C4, NAPH and UFT-LGO as properties of produced oils to be obtained when the plant is operated under the recommended operation condition. The main server 20 further calculates assessed values from the yield amounts. The main server 20 also calculates a sulfur concentration of the UFT-LGO. The main server 20 calculates a hydrogen consumption, a fuel consumption, and their costs for operating the plant under the recommended operation conditions. By these calculations, the most economical mode to operate the plant can be displayed in an easy-to-understand manner for the user.

As described above, the present embodiment provides a method for providing a recommended operation condition for a plant that produces oils by passing stock oil through a catalyst, the recommended operation condition being provided by use of a server (main server 20) connected to a user terminal 10 through a network 40. The method causes the server to acquire, from the user terminal 10, past operation data of the plant, a scheduled operation condition, the scheduled operation condition being an operation condition of the plant scheduled by a user, and plant information including at least an expiration date for use of the plant, create a catalyst degradation function specific to the user from the past operation data, calculate, based on the catalyst degradation function, the plant information, and the scheduled operation condition, a recommended operation condition with which a catalyst lifetime ends earlier than a catalyst lifetime calculated based on the scheduled operation condition and the catalyst degradation function on a premise that the plant is operated under the scheduled operation condition and later than the expiration date for use of the plant, and transmit the recommended operation condition to the user terminal 10. Thus, it is possible to obtain a recommended operation condition with which a catalyst lifetime ends earlier than a catalyst lifetime when the plant is operated under the scheduled operation condition and later than the expiration date for use of the plant. Accordingly, it is possible to operate the plant more efficiently.

In the aforementioned method, as shown in FIGS. 5A and 5B, the main server 20 transmits, to the user terminal 10, the hydrogen consumption in a case in which the plant is operated under the scheduled operation condition and the hydrogen consumption when the plant is operated under the recommended operation condition, and/or the percent yields in the case in which the plant is operated under the scheduled operation condition with and the percent yields in the case in which the plant is operated under the recommended operation condition. Thus, the user can compare, for at least one of the hydrogen consumption and the percent yields, between the case in which the plant is operated under the scheduled operation condition and the case in which the plant is operated under the recommended operation condition, and can easily judge whether to use the recommended operation condition or not.

In the aforementioned method, as shown in FIGS. 5A and 5B, the main server 20 transmits, to the user terminal 10, a scheduled operating cost required in the case in which the plant is operated under the scheduled operation condition, and a recommended operating cost estimated in the case in which the plant is operated under the recommended operation condition. Thus, the user can compare the scheduled operating cost and the recommended operating cost with each other so as to easily judge whether to use the recommended operation condition or not.

In the aforementioned method, as shown in FIG. 6, the recommended operation condition calculated by the main server 20 includes at least one of the throughput priority recommended operation condition (throughput priority mode) with which the stock oil is processed as much as possible, the percent yield priority recommended operation condition (percent yield priority mode) with which an amount of at least one of gasoline, naphtha, kerosene, light gas oil, and heavy oil distillates of produced oils is maximized, and the energy saving priority recommended operation condition (energy saving priority mode) with which partial pressure of hydrogen is made as low as possible. Since the light gas oil desulfurization plant has been exemplified in the foregoing embodiment, operation conditions with which the amount of the light gas oil (UFT-LGO) distillate is maximized are used as the percent yield priority recommended operation condition. However, in a case where the present method is applied to a direct desulfurization plant, operation conditions with which the amount of the heavy oil distillate is maximized are used as the percent yield priority recommended operation condition. In a case where the present method is applied to an indirect desulfurization plant, operation conditions with which the amount of the light gas oil distillate is maximized are used as the percent yield priority recommended operation condition. In a case where the present method is applied to a kerosene desulfurization plant, operation conditions with which the amount of the kerosene is maximized are used as the percent yield priority recommended operation condition. In a case where the present method is applied to a naphtha desulfurization plant, operation conditions with which the naphtha is maximized are used as the percent yield priority recommended operation condition. In a case where the present method is applied to a gasoline desulfurization plant, operation conditions with which the amount of the gasoline is maximized are used as the percent yield priority recommended operation condition.

As shown in FIG. 6, percent yields, yield amounts and cost varies depending on various conditions. In addition, one user may give priority to the hydrogen consumption while another user may give priority to the percent yields. Therefore, different optimal recommended operation conditions can be presented to different users. An example in which all the modes are executed in the foregoing embodiment has been shown. However, according to another configuration, the user may select which mode the user wants to execute or which index the user wants to regard as the most important so that only a corresponding mode to the selection is executed.

In the aforementioned method, the main server 20 is connected to the plant database (data server 30) storing the plant identification information, and the plant information and the past operation data for each user associated with the plant identification information. The main server 20 acquires the plant identification information from the user terminal 10, and acquires the plant information and the past operation data associated with the matched plant identification information, from the plant database.

For example, in the case where the user uses the present method periodically, the main server 20 uses the plant database to acquire the plant information and the past operation data. In this manner, the user does not have to input the plant information or the past operation data piece by piece. Consequently, user-friendliness can be enhanced.

Although the embodiment of the present invention has been described above, it is matter of course that the technical scope of the present invention should not be interpreted limitedly to the description of the present embodiment. The present embodiment is merely an example. It should be understood by those skilled in the art that various changes can be made on the embodiment within the scope of the invention described in CLAIMS. The technical scope of the present invention should be determined based on the scope of the invention described in CLAIMS and the scope of equivalents thereto.

This application is based on a Japanese Patent Application No. 2017-103776 filed on May 25, 2017, the content of which is incorporated herein by reference.

INDUSTRIAL APPLICABILITY

According to the present invention, it is possible to obtain a recommended operation condition with which a catalyst lifetime ends earlier than a catalyst lifetime when a plant is operated under a scheduled operation condition and later than an expiration date for use of the plant. Accordingly, it is possible to operate the plant more efficiently.

EXPLANATION OF REFERENCE SIGNS

1 system
10 user terminal
20 main server
30 data server
40 network

The invention claimed is:

1. A method for providing a recommended operation condition for a plant that produces oils by passing stock oil through a catalyst, the recommended operation condition being provided by use of a server connected to a user terminal through a network,
wherein the server includes a processor and a non-transitory computer-readable command recording medium storing a computer-readable command, and
wherein the method causes the server to:
acquire, from the user terminal, past operation data of the plant, a scheduled operation condition, the scheduled operation condition being an operation condition of the plant scheduled by a user, and plant information including at least an expiration date for use of the plant;
create a catalyst degradation function specific to the user from the past operation data; and
calculate, based on the catalyst degradation function, the plant information, and the scheduled operation condition, a recommended operation condition with which a catalyst lifetime ends earlier than a catalyst lifetime calculated based on the scheduled operation condition and the catalyst degradation function on a premise that the plant is operated under the scheduled operation condition and later than the expiration date for use of the plant, and transmit the recommended operation condition to the user terminal.

2. The method according to claim 1, wherein the method causes the server to transmit, to the user terminal, at least one of:
a hydrogen consumption in a case in which the plant is operated under the scheduled operation condition and a hydrogen consumption in a case in which the plant is operated under the recommended operation condition; and
a percent yield in the case in which the plant is operated under the scheduled operation condition and a percent yield in the case in which the plant is operated under the recommended operation condition.

3. The method according to claim 1, wherein the method causes the server to transmit, to the user terminal, a scheduled operating cost required in a case in which the plant is operated under the scheduled operation condition and a recommended operating cost estimated in a case in which the plant is operated under the recommended operation condition.

4. The method according to claim 1, wherein the recommended operation condition to be calculated includes at least one of:
a throughput priority recommended operation condition with which the stock oil is processed as much as possible;
a percent yield priority recommended operation condition with which an amount of at least one of gasoline, naphtha, kerosene, light gas oil and heavy oil distillates of the produced oils is maximized; and
a cost priority recommended operation condition with which partial pressure of hydrogen is made as low as possible.

5. The method according to claim 1, wherein the server is connected to a plant database in which plant identification information, and the plant information and the past operation data for each user and associated with the plant identification information are stored, and wherein the server acquires the plant identification information from the user terminal, and acquires the plant information and the past operation data that match the plant identification information from the plant database.

6. A server for providing a recommended operation condition for a plant that produces oils by passing stock oil through a catalyst, the server being connected to a user terminal through a network,
wherein the server comprises a processor, and a non-transitory computer-readable command recording medium storing a computer-readable command, and
wherein, when the computer-readable command is executed by the processor, the server:
acquires, from the user terminal, past operation data of the plant, a scheduled operation condition, the scheduled operation condition being an operation condition of the plant scheduled by a user, and plant information including at least an expiration date for use of the plant;
creates a catalyst degradation function specific to the user from the past operation data; and
calculates, based on the catalyst degradation function, the plant information, and the scheduled operation condition, a recommended operation condition with which a catalyst lifetime ends earlier than a catalyst lifetime calculated based on the scheduled operation condition and the catalyst degradation function on a premise that the plant is operated under the scheduled operation condition and later than the expiration date for use of the plant, and transmits the recommended operation condition to the user terminal.

7. A computer-readable command for providing a recommended operation condition for a plant that produces oils by passing stock oil through a catalyst, the recommended operation condition being provided by use of a server connected to a user terminal through a network,
wherein, when the computer-readable command is executed by a processor,
past operation data of the plant, a scheduled operation condition, the scheduled operation condition being an operation condition of the plant scheduled by a user, and plant information including at least an expiration date for use of the plant are acquired from the user terminal;
a catalyst degradation function specific to the user is created from the past operation data; and
a recommended operation condition with which a catalyst lifetime ends earlier than a catalyst lifetime calculated based on the scheduled operation condition and the catalyst degradation function on a premise that the plant is operated under the scheduled operation condition and later than the expiration date for use of the plant is calculated based on the catalyst degradation function, the plant information, and the scheduled operation condition, and the recommended operation condition is transmitted to the user terminal.

8. A non-transitory computer-readable command recording medium storing a computer-readable command for providing a recommended operation condition for a plant that produces oils by passing stock oil through a catalyst, the recommended operation condition being provided by use of a server connected to a user terminal through a network,
wherein, when the computer-readable command stored in the non-transitory computer-readable command recording medium is executed by a processor,
past operation data of the plant, a scheduled operation condition, the scheduled operation condition being an operation condition of the plant scheduled by a user, and plant information including at least an expiration date for use of the plant are acquired from the user terminal;
a catalyst degradation function specific to the user is created from the past operation data; and
a recommended operation condition with which a catalyst lifetime ends earlier than a catalyst lifetime calculated based on the scheduled operation condition and the catalyst degradation function on a premise that the plant is operated under the scheduled operation condition and later than the expiration date for use of the plant is calculated based on the catalyst degradation function, the plant information, and the scheduled operation condition, and the recommended operation condition is transmitted to the user terminal.

* * * * *